United States Patent
Weng

[11] Patent Number: 5,862,981
[45] Date of Patent: Jan. 26, 1999

[54] VENTILATION CONTROL DEVICE FOR A BATHROOM

[75] Inventor: Kuo-Liang Weng, Taichung Hsien, Taiwan

[73] Assignee: Yiue Feng Enterprise Co., Ltd., Taichung Hsien, Taiwan

[21] Appl. No.: 904,559

[22] Filed: Aug. 4, 1997

[51] Int. Cl.$^6$ .................................. F24F 7/06; F24F 7/00
[52] U.S. Cl. ...................... 236/46 R; 236/49.3; 454/343
[58] Field of Search ................................ 236/49.3, 46 R; 62/231; 454/343

[56] References Cited

U.S. PATENT DOCUMENTS 4,136,822  1/1979  Felter .................................. 454/343 X
4,522,335  6/1985  Kallestad .............................. 236/49.3

FOREIGN PATENT DOCUMENTS 358156 134  9/1983  Japan ...................................... 454/343

*Primary Examiner*—William Wayner
*Attorney, Agent, or Firm*—Peterson, Wicks, Nemer & Kamrath, P.A.

[57] ABSTRACT

A ventilation control device is disposed in a bathroom. The ventilation control device has a switch board, a controller connected to the switch board, a sensor connected to the controller, and a fan motor connected to the controller. The controller outputs a signal to initiate the fan motor to change a rotating speed.

3 Claims, 4 Drawing Sheets

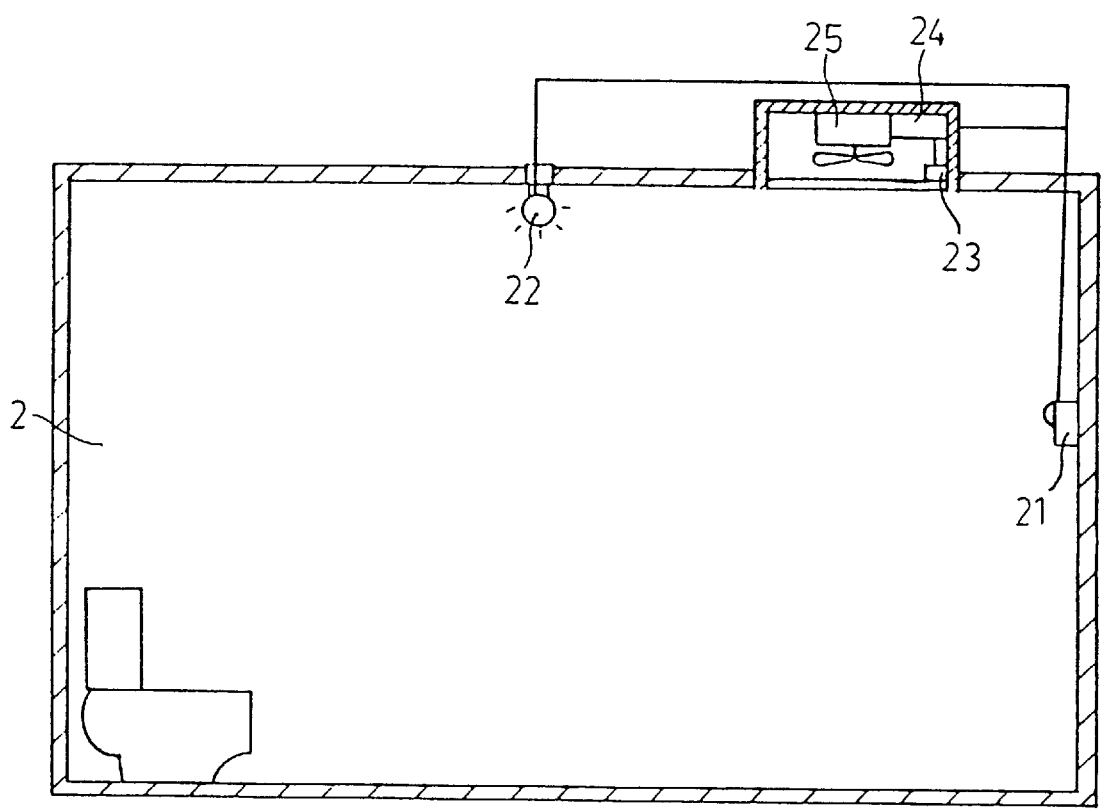
F I G. 2

VENTILATION CONTROL DEVICE FOR A BATHROOM

BACKGROUND OF THE INVENTION

The present invention relates to a ventilation control device. More particularly, the present invention relates to a ventilation control device for a bathroom.

Referring to FIG. 1, a conventional ventilation control device is a switch 11. The switch 11 initiates an operation of a lamp 12 and an operation of a fan motor 13. A ventilation opening 14 is formed in a bathroom 1. However, the fan motor 13 does not provide a variable speed at all.

SUMMARY OF THE INVENTION

An object of the present invention is to provide a ventilation control device for a bathroom in order to control a variable speed of a fan motor.

Accordingly, a ventilation control device comprises a switch board, a controller connected to the switch board, a sensor connected to the controller, and a fan motor connected to the controller. The switch board initiates an operation of the controller. The operation of the controller has the following steps.

Step 30: Input a set value into the controller.

Step 31: Input a sensitive value from the sensor.

Step 32: Compare the set value with the sensitive value.

Step 33: Output a signal from the controller to the fan motor.

Step 34: Initiate the fan motor to change a rotating speed.

Step 35: Change a wind speed.

A system diagram of the ventilation control device has the following steps.

Step 40: Start an operation.

Step 41: Input a set temperature value (TAS).

Step 42: Input a sensitive temperature value (TA).

Step 43: Determine whether TA is equal to or larger than TAS. If so, then go to Step 44. If not, then go to Step 47.

Step 44: Determine whether TA is larger than TAS plus a set difference value (X). If so, then go to Step 45. If not, then go to Step 46.

Step 45: The fan motor operates in a full speed. Then go to Step 48.

Step 46: The fan motor operates in a variable speed. Then go to Step 48.

Step 47: The fan motor operates in a lowest speed. Then go to Step 48.

Step 48: Determine whether the switch board is turned off. If so, go to Step 49. If not, go to Step 40.

Step 49: Determine whether the delayed time for stopping the operation of the fan motor is reached. If so, go to Step 50. If not, go to Step 51.

Step 50: The fan motor operates in a full speed.

Step 51: Stop the operation.

BRIEF DESCRIPTION OF THE DRAWINGS

FIG. 2 is a schematic view illustrating a ventilation control device of a preferred embodiment disposed in a bathroom;

DETAILED DESCRIPTION OF THE INVENTION

Figure 1:
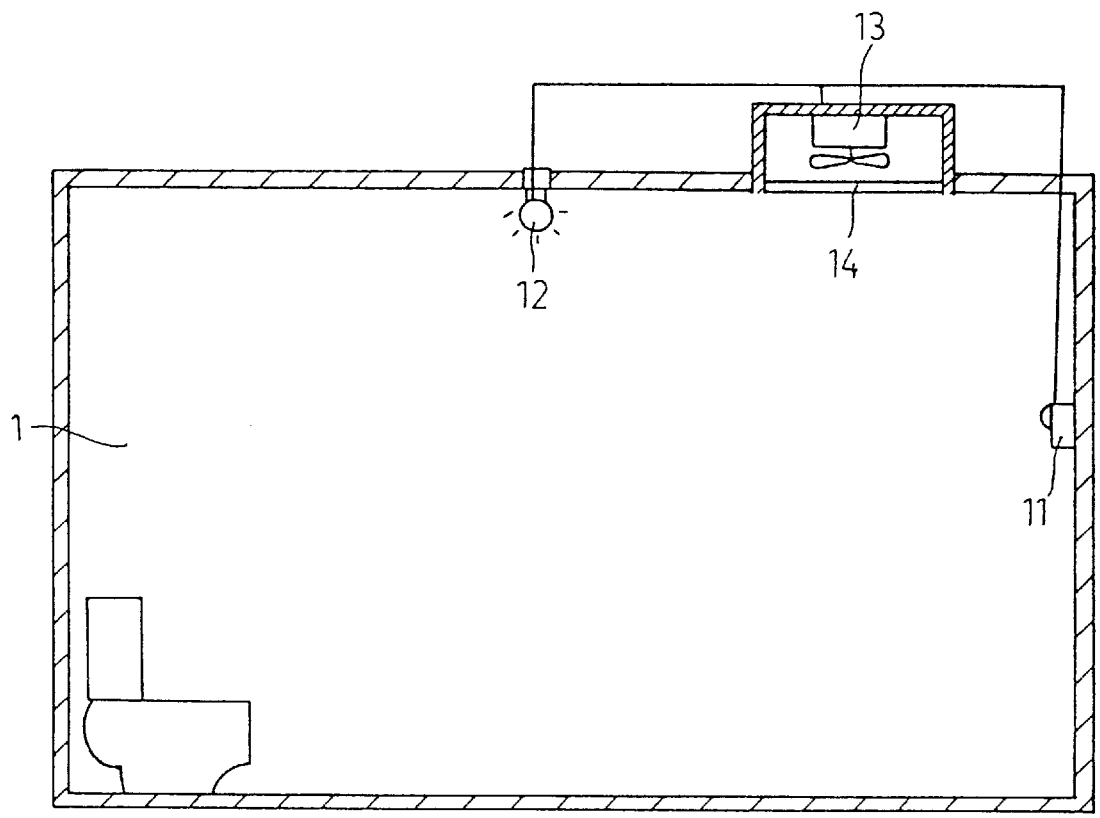
FIG. 1 is a schematic view illustrating a conventional ventilation control device of the prior art disposed in a bathroom.

Referring to FIG. 2, a ventilation control device is disposed in a bathroom 2. The ventilation control device comprises a switch-board 21, a controller 24 connected to the switch board 21, a sensor 23 connected to the controller 24, and a fan motor 25 connected to the controller 24. The switch board 21 initiates an operation of a lamp 22 and an operation of the controller 24. The sensor 23 senses a temperature and a relative humidity of the bathroom 2.

Figure 3:
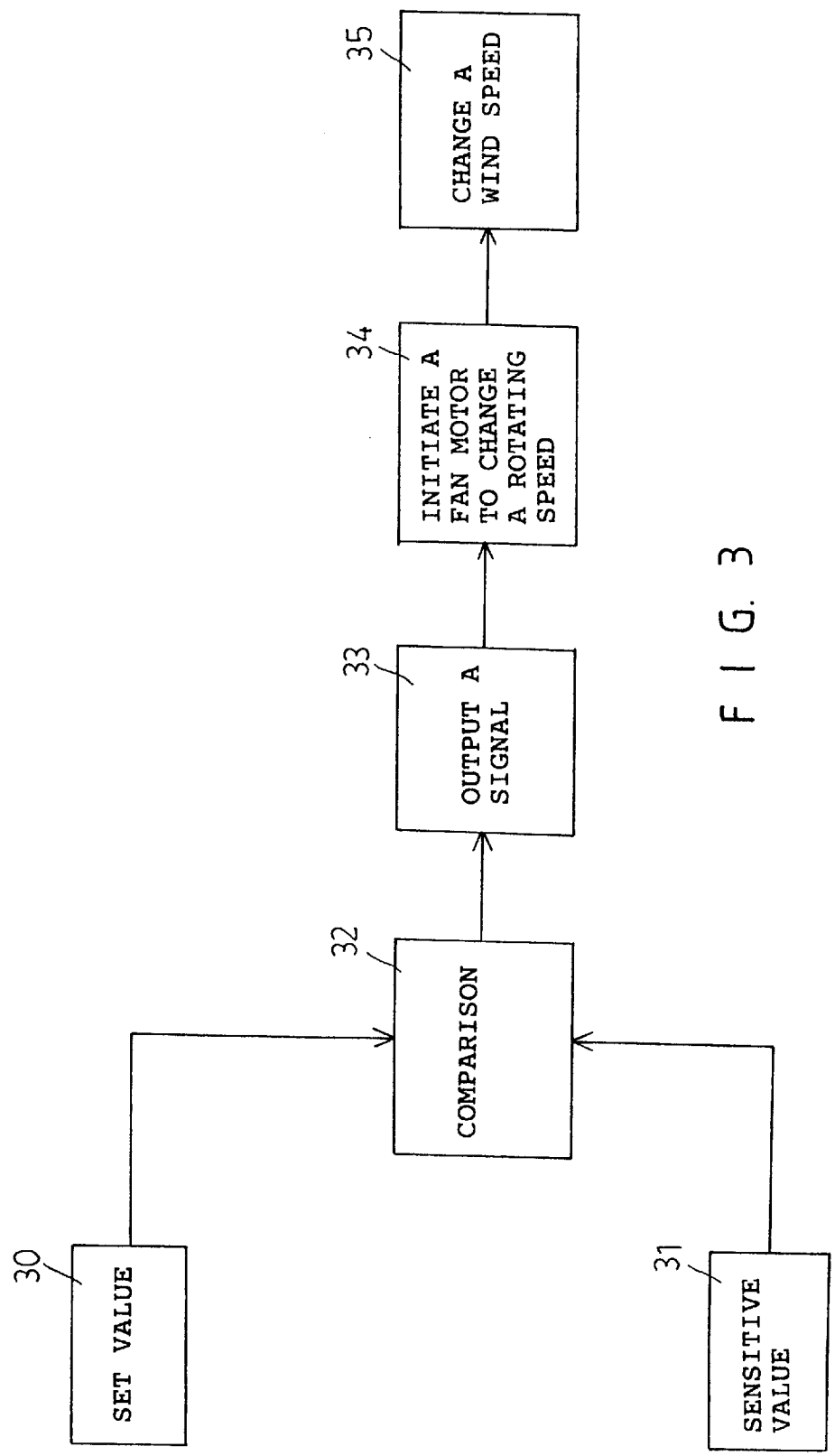
FIG. 3 is a system flow diagram of a preferred embodiment.

Referring to FIG. 3, a system flow diagram of the controller 24 has the following steps.

Step 30: Input a set value into the controller 24.

Step 31: Input a sensitive value from the sensor 23.

Step 32: Compare the set value with the sensitive value.

Step 33: Output a signal from the controller 24 to the fan motor 25.

Step 34: Initiate the fan motor 25 to change a rotating speed.

Step 35: Change a wind speed.

Figure 4:
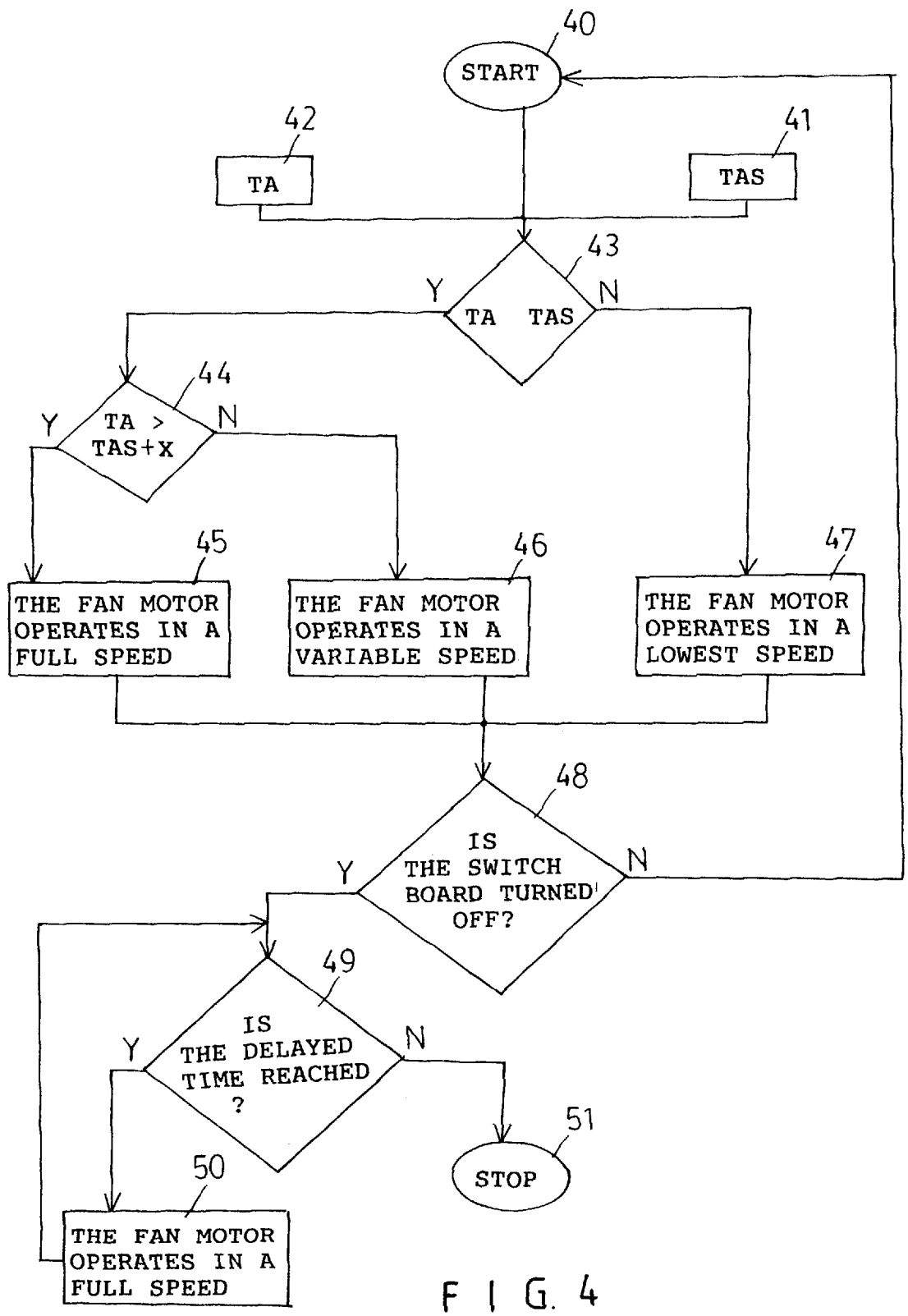
FIG. 4 is a system diagram of a preferred embodiment.

Referring to FIG. 4, a system diagram of the ventilation control device has the following steps.

Step 40: Start an operation.

Step 41: Input a set temperature value (TAS).

Step 42: Input a sensitive temperature value (TA).

Step 43: Determine whether TA is equal to or larger than TAS. If so, then go to Step 44. If not, then go to Step 47.

Step 44: Determine whether TA is larger than TAS plus a set difference value (X). If so, then go to Step 45. If not, then go to Step 46.

Step 45: The fan motor 25 operates in a full speed. Then go to Step 48.

Step 46: The fan motor 25 operates in a variable speed. Then go to Step 48.

Step 47: The fan motor 25 operates in a lowest speed. Then go to Step 48.

Step 48: Determine whether the switch board 21 is turned off. If so, go to Step 49. If not, go to Step 40.

Step 49: Determine whether the delayed time for stopping the operation of the fan motor 25 is reached. If so, go to Step 50. If not, go to Step 51.

Step 50: The fan motor 25 operates in a full speed.

Step 51: Stop the operation.

It is an option to add a plurality of function setting keys on the switch board 21. It is another option to add a time control unit on the switch board 21.

The invention is not limited to the above embodiment but various modification thereof may be made. Further, various changes in form and detail may be made without departing from the scope of the invention.

I claim:

1. A ventilation control device for an occupied space comprising:

a manually operated switch on a switch board, a controller connected to the switch board, a sensor connected to the controller, and a fan motor connected to the controller, and the switch board initiates an operation of the controller, and fan, wherein an operation of the controller has the following steps,
input a set value into the controller,
input a sensitive value from the sensor,
compare the set value with the sensitive value,
output a signal from the controller to the fan motor,
initiate the fan motor to change a rotating speed, and change a wind speed, and means to maintain fan operation for a time period after the switch is shut off.

2. A ventilation control device as claimed in claim 1, wherein a time control unit is disposed on the switch board.

3. A ventilation control device as claimed in claim 1, wherein a plurality of function setting keys are disposed on the switch board.

* * * * *